US 6,650,360 B1

(12) United States Patent
Osen

(10) Patent No.: US 6,650,360 B1
(45) Date of Patent: Nov. 18, 2003

(54) CAMERA GUIDANCE SYSTEM

(75) Inventor: Karl Osen, Dardagny (CH)

(73) Assignee: Wells & Verne Investments Limited, Jersey (GB)

( * ) Notice: Subject to any disclaimer, the term of this patent is extended or adjusted under 35 U.S.C. 154(b) by 0 days.

(21) Appl. No.: 09/073,610

(22) Filed: May 6, 1998

Related U.S. Application Data

(63) Continuation-in-part of application No. 08/666,299, filed as application No. PCT/IB94/00431 on Dec. 16, 1994, now abandoned.

(30) Foreign Application Priority Data

Dec. 23, 1993 (EP) .................................................. 9312013

(51) Int. Cl.[7] .......................... H04N 7/18; H04N 5/225; G01S 3/02; G01C 21/30
(52) U.S. Cl. ........................ 348/157; 348/169; 701/209; 342/451
(58) Field of Search .................... 348/156, 157, 348/154, 155, 142, 113, 123, 118, 169–172, 117, 144–147, 36, 37, 139; 701/23, 200, 205, 211, 207, 209, 216, 300, 302, 24, 28; 342/36, 451, 357, 457; H04N 7/18

(56) References Cited

U.S. PATENT DOCUMENTS

| | | | | |
|---|---|---|---|---|
| 3,729,582 A | * | 4/1973 | Deye et al. ................. 348/170 |
| 3,866,229 A | * | 2/1975 | Hammack ................... 342/451 |
| 4,622,458 A | * | 11/1986 | Boeck et al. ............... 342/451 |
| 4,855,747 A | * | 8/1989 | Steinberg .................... 342/179 |
| 5,130,794 A | | 7/1992 | Ritchey |
| 5,166,789 A | | 11/1992 | Myrick |
| 5,268,734 A | * | 12/1993 | Parker et al. ............... 348/169 |
| 5,296,861 A | | 3/1994 | Knight |
| 5,367,333 A | * | 11/1994 | Harriman .................... 347/117 |
| 5,396,431 A | | 3/1995 | Shimizu et al. |
| 5,416,477 A | * | 5/1995 | Shibata ........................ 701/209 |
| 5,442,558 A | * | 8/1995 | Krytsos et al. ............. 701/215 |
| 5,467,271 A | | 11/1995 | Abel et al. |
| 5,513,854 A | * | 5/1996 | Daver ......................... 348/159 |
| 5,583,513 A | * | 12/1996 | Cohen ........................ 342/357 |
| 5,586,063 A | * | 12/1996 | Hardin et al. .............. 701/300 |
| 5,633,946 A | * | 5/1997 | Lachinski et al. .......... 348/118 |
| 5,740,047 A | * | 4/1998 | Pilley et al. ................ 342/36 |

FOREIGN PATENT DOCUMENTS

| | | | |
|---|---|---|---|
| DE | 0 509 776 A2 | 10/1992 | |
| EP | 0 509 777 A3 | 10/1992 | |
| EP | 0 509 777 | * 10/1992 | ............. G01S/5/00 |
| EP | 0 545 636 A1 | 6/1993 | |
| GB | 2 213 339 A | 8/1989 | |
| GB | 2 241 623 A | 9/1991 | |

* cited by examiner

Primary Examiner—Gims S. Philippe
(74) Attorney, Agent, or Firm—Harness, Dickey & Pierce P.L.C.

(57) ABSTRACT

A camera guidance system uses global navigation satellite systems (GNSS) and Inertial Measurement Units (IMU) to point a camera on a target.

24 Claims, 6 Drawing Sheets

1

2

3

6

4

5

7   8

CAMERA GUIDANCE SYSTEM

This is a continuation-in-part of application Ser. No. 08/666,299, filed Jun. 24, 1996, now abandoned, which is a 371 of PCT/IB94/00431 filed Dec. 16, 1993, and the entire disclosure of this prior application is considered to be part of the disclosure of the accompanying application and is hereby incorporated by reference therein.

Camera Guidance System

The present invention concerns a camera guidance system allowing to acquire video signals of at least one target, by means of at least one camera, and to transmit such video signals to a receiver station. In particular, it concerns a help to the acquisition, by a camera, of close-up visual information of a target, said target being a competitor in a race, or a participant in a show.

One purpose of sports show business is to give the viewer the impression that he is in the middle of the action. For this purpose, multiple cameras are preferably acquiring close-up, breath-taking images of the leading competitors of the race, or of the star participants of the show. If such leading competitor or star participant is typically too far from the cameras, it is known to place such cameras on the competitor or participant himself, showing him at least partially. The imagery is constantly selected and re-evaluated, taking into account the most interesting views.

Shows and racing competitions have implied in a known manner the presence of cameras on or close to the participants or competitors. For example, in bicycle races, cameras are customarily mounted on a neighboring motorcycle. In sailing competition, cameras can be mounted on the top of the masts of competitors. The most difficult case for imaging is an air race or show where the competitors can very quickly move around in three dimensions, and are easily lost by the camera attendant.

The technical problem to be solved in such an environment is to allow for capture of the best imagery with automatically guided cameras, without having to carry a camera attendant which in many sports cannot be carried in the competitor's immediate vicinity. Various systems exist to monitor the position of moving bodies. Such systems are described e.g. in European Patent Applications Nos. 92303372.4 and 92303373.2. However, such systems are limited to the monitoring of the position of the bodies, and not of their orientation or attitude.

SUMMARY AND OBJECTS OF THE INVENTION

The system according to the invention allows to replace the camera attendant by a highly efficient tracking system; in particular, it allows to automatically keep a selected target in the viewing frame of a camera. For this purpose, the targets continuously provide information on their position and attitude coordinates to the camera platform with the communication means. The information on the position and attitude of the targets are processed by the information processing means of the platform, to be converted into platform coordinates and fed to the pointing systems of the cameras. Each target can be followed by a plurality of cameras on a platform, each camera having its own pointing system. All camera pointing systems use the information on the position of the particular target that has been allocated to them. This allows all candidates for the show to be constantly in view, ready for selection.

The present invention accomplishes this by a platform supporting the camera. The platform is movable into a plurality of positions for pointing the camera at the target. Target position means is mounted on the target for determining a position of the target and transmitting the position of the target to a processing means. The processing means receives the position of the target from the target position means, and determines a relative target position of the target position means with respect to the platform. The processing means then moves the platform to point the camera at the target.

In a first embodiment of the invention, the receiver station is on the platform and stores the video signals acquired by the cameras, either definitively, with e.g. classic 16 mm film technology, or erasable, with e.g. video tape technology.

In a second embodiment of the invention, the receiver station is not located on the platform and its attendants can instantly modify the allocation of the cameras to the target. This allows for optimization of the allocation of the targets to the cameras.

In a particular embodiment of the invention, each target can also serve as a platform, allowing the receiver station to select the most appropriate platform, and cameras on said competitors for the show. In this embodiment, information on position and attitude of all the targets and platform are delivered by said targets and platforms to the information processing systems of the other targets and platforms via the communication means. The information on attitude of the target is not necessarily useful for the guidance of the allocated cameras, but it becomes important if the target is later selected as a platform, as well as for extrapolation purposes if the efficiency of the communication means is temporarily reduced.

In a particular embodiment of the invention, if said receiver station, generally a ground station, is remote from the race, the means for transmitting the video signals can include one or more relay stations; said relay stations are equipped with antennas to convey the video signals from the platform's cameras. It should be noted that in the latter case, the relay stations also advantageously provide their coordinates to the information processing means, so that the antennas can be efficiently oriented towards each other to ensure optimal transmission quality.

In a particular embodiment of the invention, the position and attitude data are acquired by global navigation satellite systems, such as systems-known under the names of NAVSTAR/GPS and GLONASS, or more generally GNSS (Global Navigation Satellite System). Such systems are described e.g. in the European Application No. 92310832.8, or in UK Patent Application No. 8827257. U.S. Pat. No. 5,467,271 teaches how to generate agricultural maps with the help of GPS. U.S. Pat. No. 5,583,513 to Cohen describes a system for attitude determinations. U.S. Pat. No. 5,130,794 discloses a panoramic display system. U.S. Pat. No. 5,166,789 discloses an earth surface surveying system using infrared camera.

U.S. Pat. No. 5,396,431 discloses a navigation system with position measuring device and aerial photographic storage capability.

In a particular embodiment of the invention, the position of the target in platform coordinates is obtained by subtracting the platform's global position vector from the target's global position vector and projecting the resulting vector onto the platform coordinate system. Such data can be obtained in particular with the help of a differential global navigation satellite system, or D-GNSS, which will provide attitude data by triangulation.

An example of such a D-GNSS system is described in UK Patent Application No. 9004433.0.

In a particular embodiment of the invention, the pointing systems of the cameras allow them to point to any direction.

In a simplified environment where every object has a fixed assignment, and e.g. one platform can film one target, it is generally not necessary to acquire attitude data of the target, so that a GNSS receiver on the target will suffice for determination of the target's position; for the platform and any moving relay stations, on the contrary, attitude is important for the pointing of cameras and antennas. Thus the platform and each relay station will need GNSS receivers for position and at least two additional GNSS receivers for attitude.

U.S. Pat. No. 5,296,861 to Knight teaches determination of attitude data of objects.

In a particular embodiment of the invention, the global positioning system of a target is supplemented by at least an Inertial Measurement Unit (IMU) or more generally by an inertial navigation system to which such an IMU belongs. An IMU is typically constituted by three accelerometers coupled with gyroscopes. The accelerometers measures linear acceleration, and the gyroscopes measures angular speeds.

In a preferred embodiment, an IMU is used for motion measurements for each axis Ox, Oy, Oz of the coordinate system of the target. A platform or a relay station can also be equipped with an IMU. An IMU is useful if, for instance, communication between the satellites and the global positioning systems of the object is made less efficient or interrupted by interposition of other objects. A typical cycle duration, for a global positioning system as practically used in the invention, being of one second, an interruption of transmission between the GNSS satellites and a GNSS receiver can last several seconds; with the input of an IMU as described above, the information processing means of the object can extrapolate from the last available position and attitude data of the object before the interruption took place, until a final correction is made when communication with the satellites is re-established.

In a particular embodiment of the invention, where space or weight constraints may exist on the targets, on the platforms or on the relay stations, there is a need to reduce the number of GNSS receivers. A target or platform or relay station can then be equipped by only one GNSS receiver and one IMU to obtain both position and attitude, on the condition that the target or platform or relay station is moving along a true three-dimensional trajectory with a speed that is superior to a minimal value. This value depends on the characteristics of the IMU, which functions best when the speed is high and the trajectory curved. However, the speed needs not to be determined in advance; neither does the path that will be followed by the target or platform or relay station. The only constraint is that the speed is high enough for the IMU to function adequately. Such a system entails using the data from the same GNSS receiver obtained at known time intervals to determine the position of the target or platform or relay station, and using the IMU to precisely measure the relative evolution of the position of the target or platform or relay station between two position determinations by the GNSS receiver. Such measurement allows the calculation of the orientation of the mobile coordinate system of the target, platform or relay station in relation to a coordinate system that is earth fixed. This orientation can be expressed by the Euler angles of the mobile coordinate system in relation to the earth-fixed coordinate system.

It is known that IMU data suffer from errors called drift errors. These drift errors accumulate with the elapsed measurement time, and are detrimental to the accurateness of the calculations. In a particular embodiment of the invention, the length of the time intervals, i.e. the duration between two GNSS measurements, can be adapted to adequately correct said drifts errors before they grow to an unacceptable value. The drift errors of the IMU used dictate the required performance of the GNSS receiver: the higher the drift the shorter the interval must be between data received from the GNSS receiver and vice versa.

In a particular embodiment of the invention, the trajectories of the various targets, platforms and relay stations stay confined within known boundaries. This is the case, for instance, in automotive competition. Motor races are run on a circuit where the tracks are limited, in a more or less flexible manner, by barriers, obstacles, sand pits or other track boundaries. In such a case, the circuit topography is known, i.e.: variations in altitude, presence of bridges and hills, and particularly tunnels. Tunnels are particularly important because they preclude adequate function of the GNSS part of the system. The track boundaries and its three-dimensional topography can in such cases advantageously be pre-recorded in the information processing means. The position and attitude of a target, platform, or relay station can then be determined by correlating of the three-dimensional accelerations and rotations as detected by the IMU with a computer-based map. Stored track boundaries and surface topology allow in this case to compensate the drift errors of the IMU; for this method to work the vehicle must, however, move quite fast and get close to the track boundaries from time to time.

More precisely, when the target or platform or relay station trespasses or touches a track boundary, the resulting motion generated by the curbs or change in surface roughness are detected by the IMU and interpreted by the information processing means.

This allows to suppress in some cases the GNSS part of the equipment, or to make the position determination process more robust through redundancy.

In particular, it is known that in the case of a motor racing circuit, the performance of GNSS is lower not only in tunnel, but also when certain parts of the circuit are prone to reflections of satellite of signals, leading to so-called "multipath" phenomenons. This is the case for high buildings, bridges and fences. In these parts, the data measured by the IMU are essential to the functioning of the camera guidance system.

In a particular embodiment of the invention, also applying to the previous case where the trajectories are within known boundaries, the initialization of the system is facilitated by providing the information processing means with additional, complementary data. These data consist, for example, in signals that are sent by a photo-electrical cell that is placed in a given place in the race circuit, and detects the passing by of a target, platform or relay station. This embodiment provides redundant data that can be used to enhance corrections of drift errors and to complete refresh operations, as previously described, which are performed when track boundaries are touched.

In a particular embodiment of the invention, specially applying to systems where the IMUs used have a tendency to under-perform due to low speeds that are detrimental to their efficiency, wheel rotations sensors or steering equipment sensors are installed on the target, platform or relay station. These sensors provide other kinds of supplemental data that help the information processing means to verify and correct the data otherwise provided. It is clear that in the case of high speeds on the race track, these supplemental data must be analyzed or filtered because of skidding that affect the wheels; such skidding introduces an erratic bias in the data provided by these sensors.

In a particular embodiment of the invention, GNSS satellites are replaced by pseudo-satellites generally referred to as pseudolites. These pseudolites are disposed at fixed locations in close vicinity of an elevated support or a ceiling, and transmit signals that are similar to GNSS satellites; through the information processing means they can efficiently provide platforms and relay stations with data that are necessary to film the targets, as will now be explained.

Sources of electromagnetic signals are disposed on the pseudolites. Receivers of these signals, which may indeed be normal GNSS receivers, are disposed on the targets, platforms or relay stations; these signals, once received, allow information processing means to:

calculate the distances between the receivers and each of the sources;

calculate the position and attitude data of the target, platform or relay station carrying the receivers.

This allows in turn the cameras to point exactly to the targets, and the antennas conveying the video information to point to the relay stations. The speed of the signals is close to the speed of light, and the distance between a source and a receiver is calculated from the time taken by a signal to cover such distance.

Practically, experience has shown that some redundancy in measurements and the subsequent calculations is useful. It allows to perform averaging calculations and to eliminate erroneous measurements and results by plausibility tests that are known in the art.

BRIEF DESCRIPTION OF THE DRAWINGS

The invention will now be illustrated in more detail by reference to the accompanying drawing, in which.

DESCRIPTION OF THE PREFERRED EMBODIMENT

Figure 1:
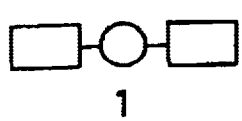
FIG. 1 shows schematically two aircraft, a relay aircraft, three global positioning satellites, a video link ground station, and a communications link ground station.
Figure 1:
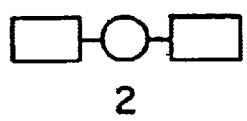
Figure 1:
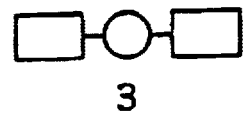
Figure 1:
Figure 1:
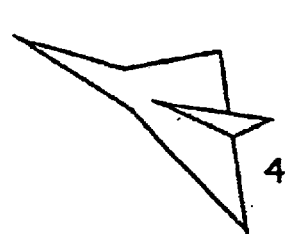
Figure 1:
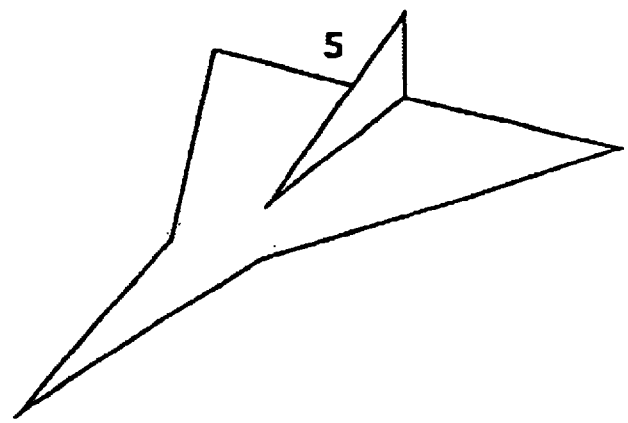
Figure 1:
Figure 1:

FIG. 1 shows two aircraft 4, 5 as viewed by a hypothetical viewer, supposedly aboard an auxiliary observing plane. Three global navigation stations, such satellites 1, 2, 3 are represented, although such systems generally comprise many more satellites. A relay aircraft 6 permits the aircraft 4 and 5 to transmit video signals to a ground based receiver 8. The relay aircraft 6 also relays communications between the aircraft 4, 5 and a ground based communication station 7. It is to be noted that any of the two aircraft 4, 5 can a priori be the target or the platform; the information processing means (not shown) are distributed between the aircraft 4, 5, 6, the communication station 7 and the receiver 8.

Figure 2:
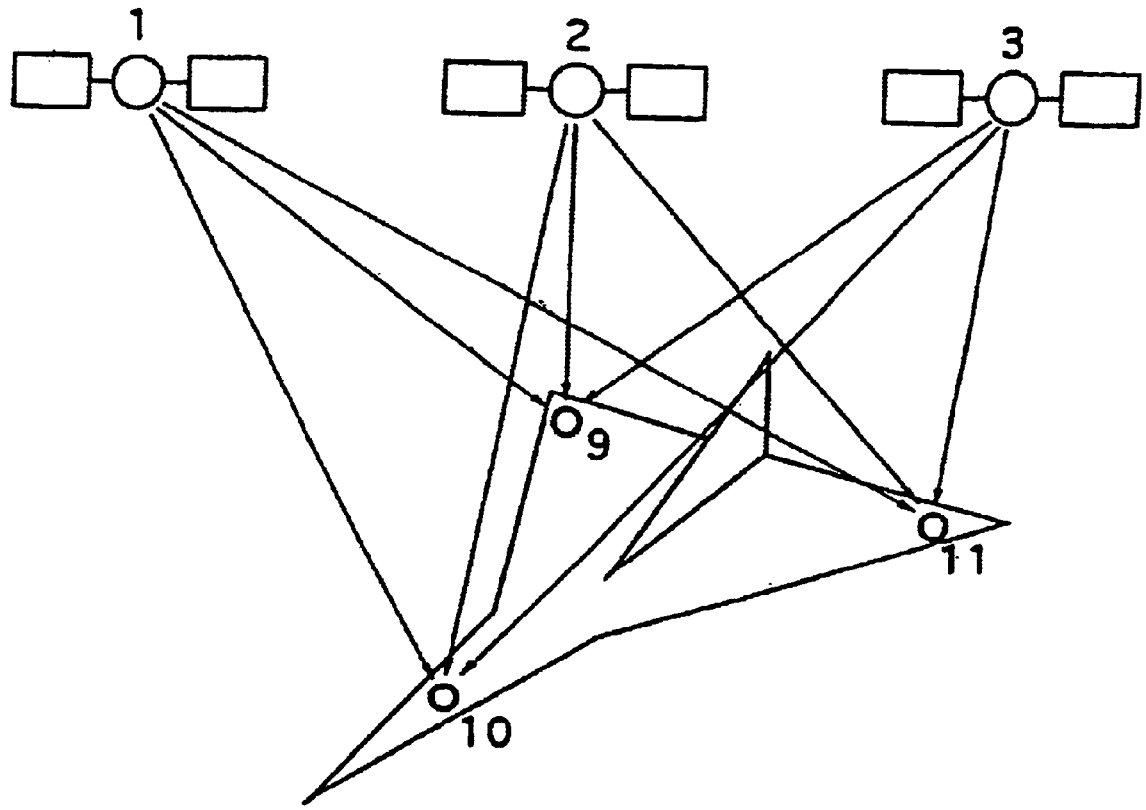
FIG. 2 shows schematically how the global navigating satellite system (abbreviated in GNSS) functions with the help of three satellites, and illustrates how this system can be used to perform attitude measurements.

FIG. 2 shows how any one of the aircraft represented in FIG. 1, namely the two aircraft 4, 5 and the relay aircraft 6 have (at least) three position determining means, such GNSS receivers 9, 10, 11 enabling the information processing means (not shown) to calculate the position of the aircraft and its attitude. It can be noted that a typical GNSS provides a precision of the range of 30 to 100 meters; however, measurement of the variations in distances are much more accurate, in the range of the millimeter, because the error in the distance information provided by a given satellite is constant, and introduces a highly accomodable bias. The multiplicity of available satellites introduce additional measurement safety by way of redundancy. The information processing means, known in themselves e.g. from the previously cited patent document, allow in particular to calculate the global position vector of all three receivers 9, 10, 11, and consequently the orientation of an aircraft-bound coordinate system, its Euler angles, and the variation of these data at every calculation cycle.

Figure 3:
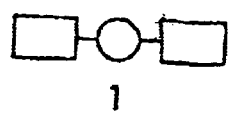
FIG. 3 shows the path of the video signals, illustrating how the camera platform aircraft films the target aircraft and the operation of the means for transmitting the video signals.
Figure 3:
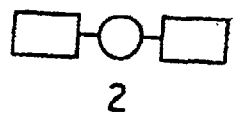
Figure 3:
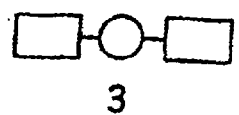
Figure 3:
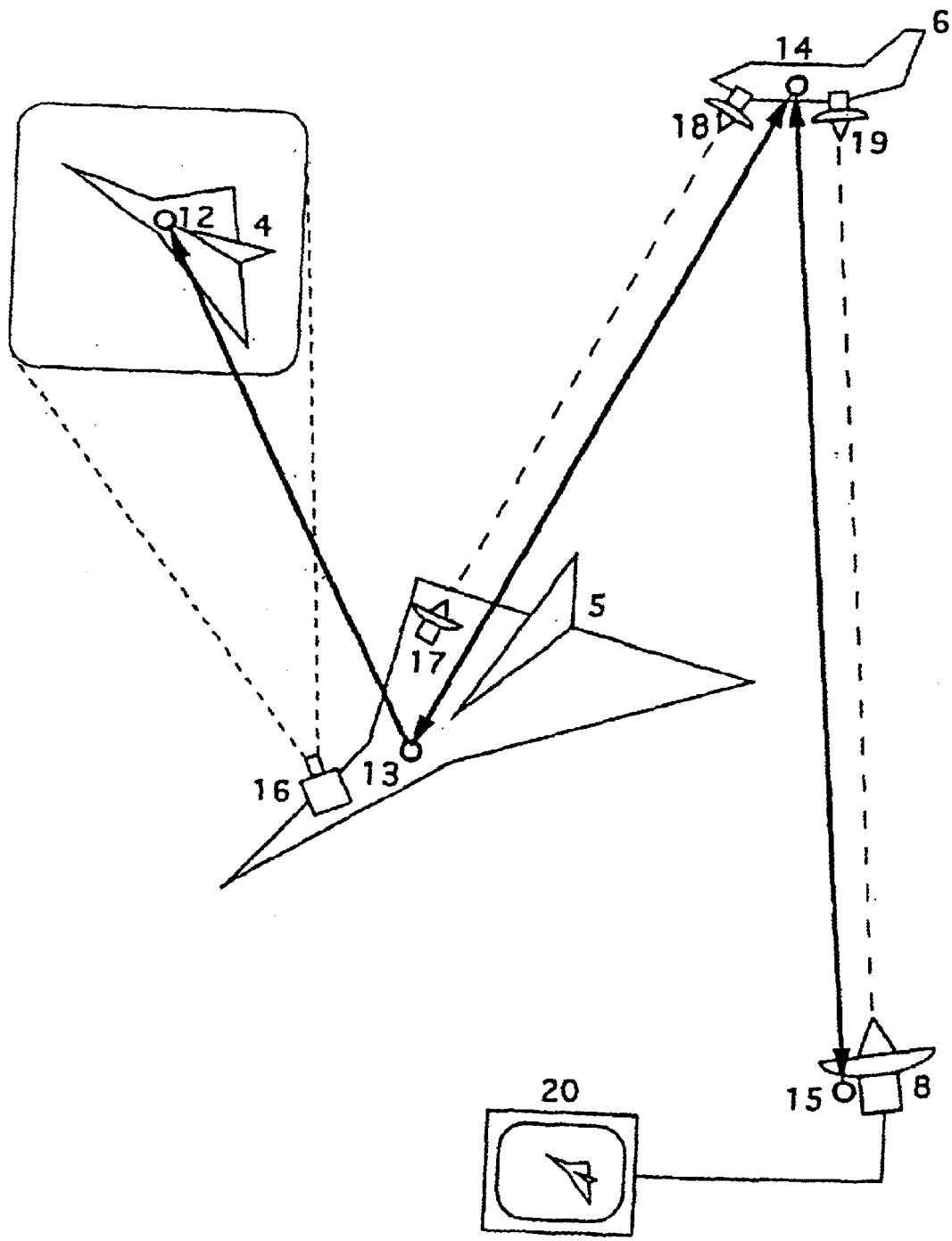

FIG. 3 shows how the video signals acquired by the camera 16 from the target 4 are first transmitted (in dotted lines) via the antennas 17, 18 from platform 5 to relay station 6, then via antenna 19, to ground station 8 with a television monitor 20. The operation of such means for transmitting video signals includes precise pointing, not only of camera 16 to target 4 thanks to GNSS 12 and 13, but also of antennas 17 and 18 to each other thanks to GNSS 13 and 14, and in turn of antenna 19 and ground station 8 to each other, thanks to GNSS 19 and 15. Such precise pointing is allowed by the information processing means (not shown), fed by GNSS data, that can convert any global position vector from earth coordinates to relative coordinates. For example, the global position vector of target 4 is a vector having its origin at the center of earth and its extremity at GNSS 12; the global position vector of the platform 5 is a vector having its origin in the center of earth and its extremity at GNSS 13. The information processing means allow to take into account the attitude of platform 5, as determined by the three GNSS 9, 10, 11 (FIG. 2) in order to correctly point camera 16 to target 4, according to a vector having its origin at GNSS 13 and its extremity at GNSS 12.

Figure 4:
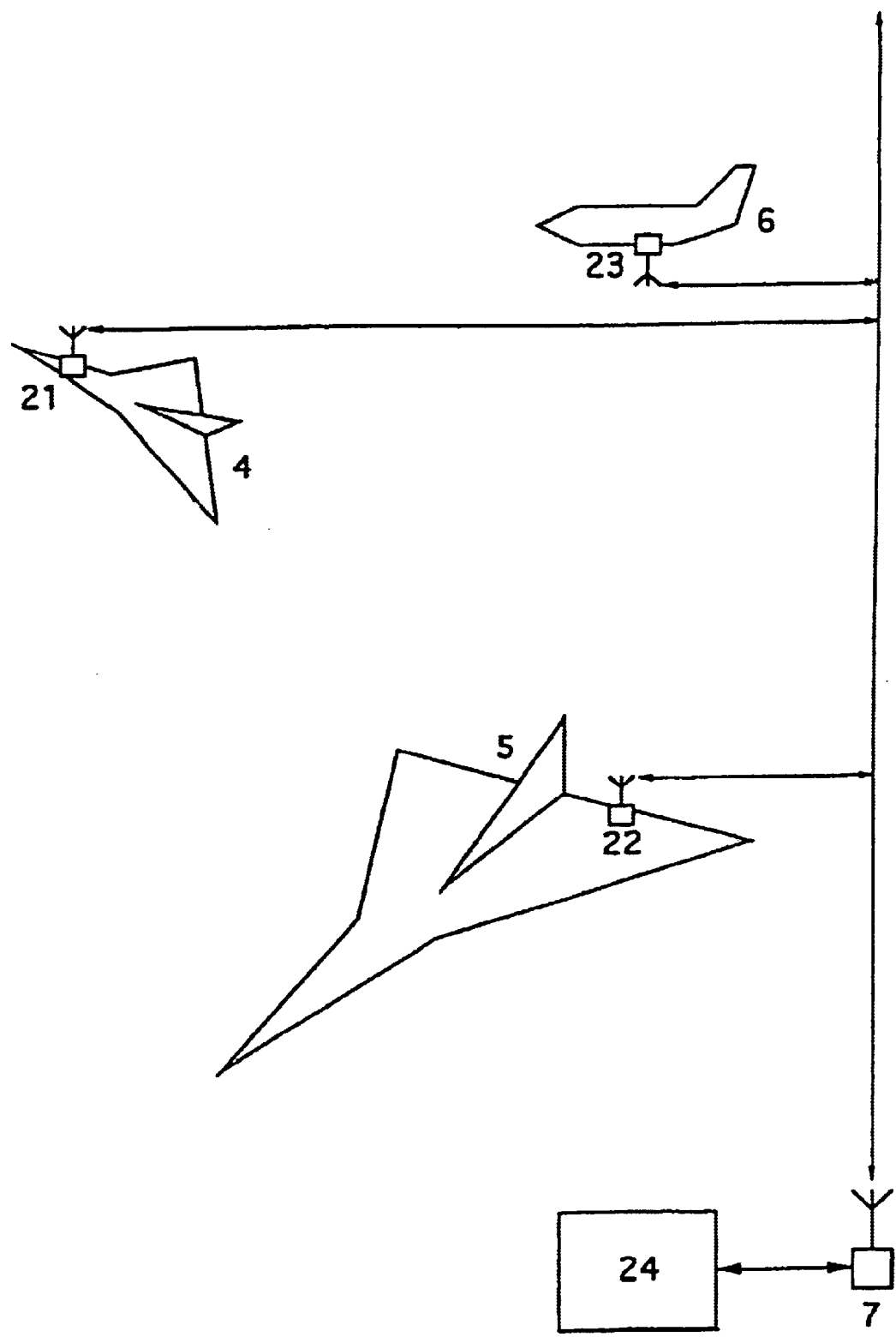
FIG. 4 shows schematically the operation of the communication means, particularly how the three aircraft and the ground station communicate.

FIG. 4 shows schematically how the three aircraft 4, 5, 6 and the ground station 7 may communicate using radio equipment with omni-directional antennas 21, 22, 23. Such antennas do not need to be pointed to one another to communicate, unlike antennas of the means for transmitting video signals. This has been shown schematically by doubles arrows on FIG. 4. All the above entities of the exemplified system may use the same frequency for broadcasting their global position vectors, the current satellite usage, camera control information, and other relevant data. To permit the use of one single frequency a wireless adaptation of the Carrier Sense Multiple Access with Collision Detection communications standard may be used (ANSI/IEEE Std 802.3-1985 and ISI/DIS 8802/3). Also shown is a ground control unit 24, where camera selection, target selection, and zoom control takes place. The information processing means of the ground control unit operate with the information processing means of the aircraft to coordinate activities and to distribute information processing tasks.

Figure 5:
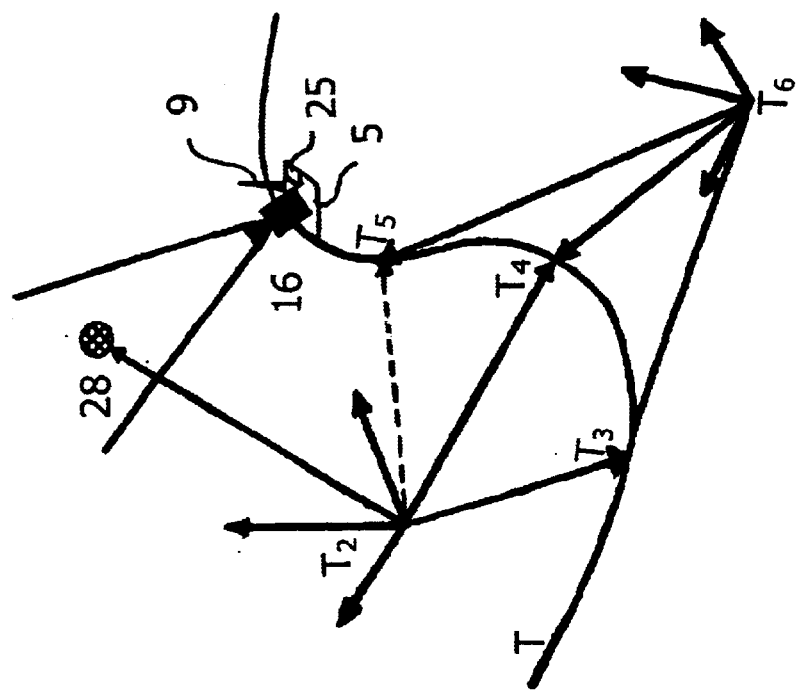
FIG. 5 shows a target being filmed with the help of an IMU.

FIG. 5 shows a target 28, equipped with a GNSS receptor and filmed by a camera 16 on a platform 5. Platform 5 is moving on a trajectory T. It is equipped by a GNSS receiver 9 and an Inertial Measurement Unit 25.

Three positions of the platform 5 on the trajectory T have been represented at $T_3$, $T_4$ and $T_5$. These positions are measured by reference to a fixed, earth-bound system of coordinates $T_2$.

Simultaneously, IMU 25 detects the accelerations (biased by the earth's gravitation) affecting platform 5 with respect to an inertial system of coordinates $T_6$.

Information processing means use these positions measurements to calculate the precise position and attitude of the platform 5, i.e. its Euler angles with reference to $T_2$. The position of target 28 is determined by its own GNSS receiver.

The information processing means then calculate the pointing angles of the camera 16 and its zoom data, in order to constantly keep target 28 in the frame of camera 16, with the correct focus.

Figure 6:
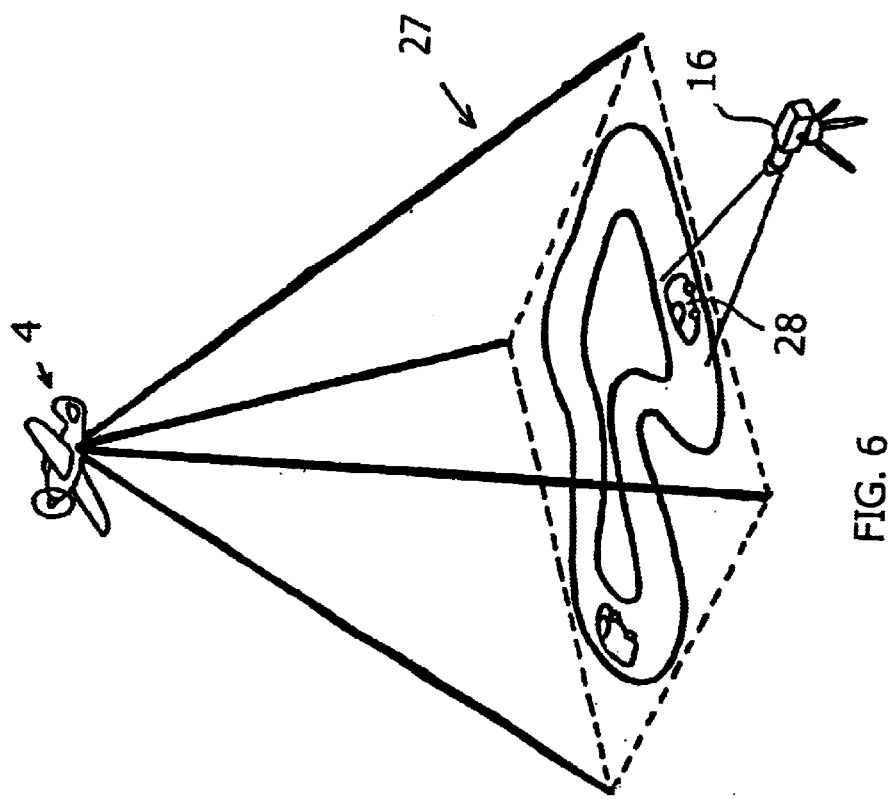
FIG. 6 shows an embodiment with two cameras on a motor race circuit.

FIG. 6 represents a motor race circuit 27 filmed by at least two cameras. One of the cameras is on-board a plane 4 flying above the circuit 27. Information processing means include image analysis capabilities; these process the images from the on-board camera and provide an estimate of the position of a target 28 which is a competitor in a race; they provide to the pointing mechanism of a second camera 16 the necessary information to effectively point this second camera 16 to target 28, thus providing commercially usable images of the competitor in the race. The images shot by second camera 16 can further be analyzed by image analysis capabilities, thus helping more cameras along the track of circuit 27 to capture close-up images of target 28 as its passes by them.

Figure 7:
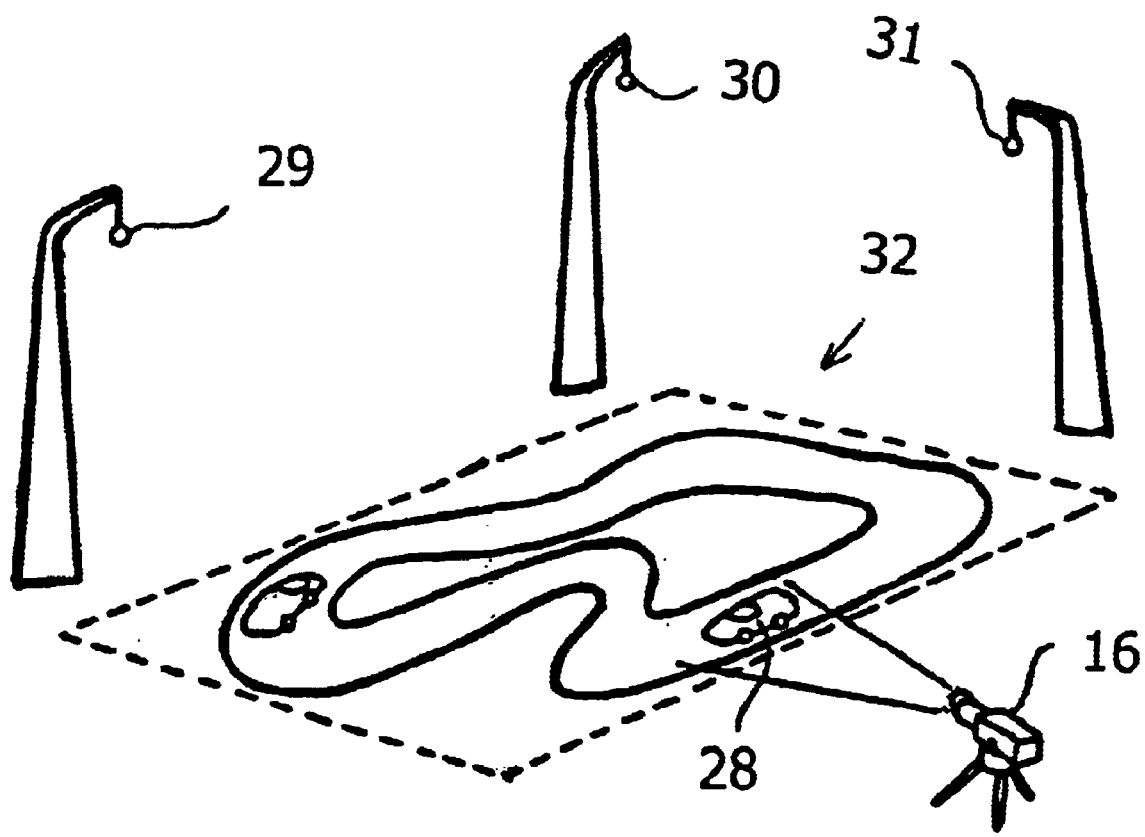
FIG. 7 shows a similar embodiment with one camera and three pseudolites.

FIG. 7 shows a motor race circuit. On high poles surrounding the circuit (or underneath the roof of an indoor arena) are mounted pseudolites 29, 20, 31.

The target 28 is equipped with a receiver that receives electromagnetic signals from pseudolites 29, 30, 31; information processing means calculate, from said signals, the distances between pseudolites 29, 30, 31 and target 28. These distances allow to locate precisely target 28 on the track of circuit 32 and to effectively point camera 16 on target 28 with the right focus and zoom data. This permits acquisition of top quality imagery of any competitor in the race, including clear exposure of sponsor advertising carried by the competitors.

What is claimed is:

1. A camera guidance system allowing to acquire video signals, irrespective of conditions of visibility, contrast and background, of at least one target, by means of at least one camera, and to transmit such video signals to a receiver station, characterized in that it comprises
   a platform supporting said at least one camera, such camera being able to focus on the target, following its movement relative to the platform;
   at least one position determination means such as Global Navigation Satellite System (GNSS) receivers is mounted on the target, and is able to determine the target's position in GNSS coordinate system,
   at least three position determination means such as Global Navigation Satellite System (GNSS) receivers mounted on the platform to determine the position and attitude of said platform in GNSS coordinate system, said platform having a platform coordinate system fixed to it, and,
   the position of the target in platform coordinates is obtained by subtracting the platform's global position vector from the target's global position vector and projecting the resulting vector onto the platform coordinate system,
   the camera on the platform is pointable in a plurality of directions with respect to the platform coordinate system,
   processing means for computing positioning data and providing said data to said positionable camera to make the camera point at the target;
   means for transmitting the video signals to a receiver station;
   communication means between the said information, position determination and transmission means.

2. A system according to claim 1, in which the transmitting means convey video signals acquired by the camera, either to a film or tape for recording such signals, or to at least one receiver or relay station.

3. A system according to claim 2, characterized in that
   the allocation of a camera to a target can be modified,
   the target can also serve as a platform and the platform as a target,
   the global positions, relative positions, and attitude date of target, the platform and the relay stations are acquired by global navigation satellite system (GNSS) receivers, and
   the relay stations are equipped with orientable directional antennas able to use the communication means-and position determination means to point said antennas to other relay stations or to the receiver stations.

4. A system according to claim 3, in which the GNSS receivers are supported by inertial navigation systems.

5. A system according to claim 1, in which the target and the platform are aircraft.

6. A system according to claim 1, in which the platform and the target are vehicles.

7. A system according to claim 1, in which the targets are vehicles equipped with GNSS receivers, and cameras with enhanced zoom capabilities are positioned around a motor race circuit so as to be able to fully use zoom factors with the help of the position of the cars as provided by their GNSS receivers.

8. A system according to claim 1, win which the platform is an aircraft and the targets are ground vehicles.

9. A system in accordance with claim 1, wherein:
   said camera acquires video of the target for broadcasting, said camera being able to acquire close-up images of the target with long focal length lenses.

10. A camera guidance system for a camera tracking a target, the system comprising:
    a platform supporting the camera, said platform being movable into a plurality of positions for pointing the camera at the target;
    target position means for determining a position of the target, said target position means being mounted on the target and transmitting said position of the target away from the target;
    processing means for receiving said position of the target from said target position means, said processing means determining a relative target position of said target position means with respect to said platform, said processing means moving said platform to point the camera at the target based on said relative target position;
    platform position means at said platform for determining a position of said platform and transmitting said position of the platform to said procesing means, said processing means using said position of the target and said position of said platform to move said platform and point the camera at said target.

11. The system in accordance with claim 10, wherein:
said position of said target and said position of said platform are determined in a common coordinate system;
said processing means detmies a difference position in platform coordinates between said position of the target and said position of said platform, said difference position in said platform coordinates indicating how to move said platform.

12. The system in accordance with claim 10, wherein:
said platform position means receives signals from navigation stations to determine said position of said platform.

13. The system in accordance with claim 10, wherein:
said target position means and said platform position means receives signals from identical navigation stations to determine said position of the target and said position of said platform.

14. The system in accordance with claim 11, wherein:
said common coordinate system is a global coordinate system.

15. The system in accordance with claim 10, wherein:
the camera has a zoom feature;
said processing means controls said zoom feature based on said relative target position.

16. A system in accordance with claim 10, wherein:
said camera records video of the target and converts the video of the target into video signals;
a television display receives said video signal from said camera and converts said video signal into said video of the target, said display then displays said video of the target.

17. A system in accordance with claim 10, wherein:
said camera acquires video of the target for broadcasting, said camera being able to acquire close-up images of the target with long focal length lenses;
said target position means include Global Navigation Satellite System (GNSS) receivers for determining said position of the target.

18. A system in accordance with claim 10, wherein:
said camera is pointable in a plurality of directions for pointing the camera at the target;
said target position means is independent from terrestrial installation;
at least one camera position determination means is provided for acquiring a position of the camera in a same coordinate system as the target position means;
said processing means receives said position of the target from said target position means and said position of the camera from said camera position determination means, said processing means determining a relative target position with respect to said camera, said processing means moving said camera to point at the target based on said relative target position;
the camera guidance system tracks the target and acquires video signals irrespective of conditions of visibility, contrast and background;
said target position means transmits a signal where a content of the signal uniquely identifies said position of the target.

19. A method for pointing a camera to a target, the method comprising the steps of:
determining a position of the target, said determining of said position being performed at the target;
transmitting said position of the target away from the target;
determining a position of the camera, said determining of said position of said camera being performed at the target;
calculating a relative position of the target relative to the camera based on said position of the target transmitted from the targets and on said position of said camera, said calculating occurring at a location spaced from the target;
moving the camera based on said calculating to follow movement of said target.

20. The method in accordance with claim 19, wherein:
said determining of said position of the target is performed in a global coordinate system and is performed on the target;
said calculating of said relative position is performed in platform coordinates.

21. The method in accordance with claim 19, wherein:
said determining of said position of the target and said position of the camera is performed in a common coordinate system independent of the camera and the target;
said calculating of said relative position is performed by calculating a difference between said position of the camera and said position of the target.

22. The method in accordance with claim 21, wherein:
said determining of said position of the target is performed using a Global Navigation Satellite System (GNSS) receiver mounted on the target;
said determining of said position of the camera is performed using a Global Navigation Satellite System (GNSS) receiver spaced from the target;
said calculating of said relative position is performed by subtracting said position of the camera from the position of the target.

23. The method in accordance with claim 19, wherein:
the camera is on a platform positionable to point in a plurality of directions with respect to the coordinate system of the platform, in order to acquire video signals of the target via relay stations;
at least one of the camera, target or relay stations is equipped with a GNSS receiver and an Inertial Measurement Unit (IMU);
position measurements are made by the GNSS receiver and the IMU at known time intervals;
platform attitude from said measurements are computed to point the camera on the target;
a position and orientation in platform coordinates are calculated by subtracting the platform's global position vector from the target's global position vector and projecting the resulting vector onto the platform coordinate system;
said platform is moved according to said resulting vector.

24. A method in accordance with claim 19, wherein:
said moving of the camera causes the camera to follow the target when the target moves out of a field of view of the camera.

* * * * *